US009262577B2

(12) United States Patent
Chen et al.

(10) Patent No.: US 9,262,577 B2
(45) Date of Patent: Feb. 16, 2016

(54) LAYOUT METHOD AND SYSTEM FOR MULTI-PATTERNING INTEGRATED CIRCUITS

(71) Applicant: Taiwan Semiconductor Manufacturing Co., Ltd., Hsin-Chu (TW)

(72) Inventors: Huang-Yu Chen, Zhudong Township (TW); Tsong-Hua Ou, Taipei (TW); Ken-Hsien Hsieh, Taipei (TW); Chin-Hsiung Hsu, Guanyin Township (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

(21) Appl. No.: 14/267,013

(22) Filed: May 1, 2014

(65) Prior Publication Data

US 2014/0237435 A1    Aug. 21, 2014

Related U.S. Application Data

(63) Continuation of application No. 13/535,705, filed on Jun. 28, 2012, now Pat. No. 8,745,556.

(51) Int. Cl.
*G06F 17/50* (2006.01)

(52) U.S. Cl.
CPC ........ *G06F 17/5081* (2013.01); *G06F 17/5072* (2013.01); *G06F 2217/12* (2013.01)

(58) Field of Classification Search
CPC ............ G06F 2217/12; G06F 17/5081; G06F 17/5072; G03F 7/0035
USPC ..................... 716/52, 55, 112, 139
See application file for complete search history.

(56) References Cited

U.S. PATENT DOCUMENTS

| 5,538,815 | A | 7/1996 | Oi et al. |
| 6,391,501 | B1 * | 5/2002 | Ohnuma ................. 430/22 |
| 6,436,587 | B1 | 8/2002 | Ulrich et al. |
| 8,111,901 | B2 | 2/2012 | Nikolsky |

(Continued)

FOREIGN PATENT DOCUMENTS

| TW | 200933290 A1 | 8/2009 |
| TW | 200944954 A1 | 11/2009 |

OTHER PUBLICATIONS

"Progress on Steinberg's Conjecture", retrieved from http://stat.asu.edu/~checkman/Steinberg.html, 2007, 4 pages.

(Continued)

*Primary Examiner* — Helen Rossoshek
(74) *Attorney, Agent, or Firm* — Duane Morris LLP; Steven E. Koffs

(57) ABSTRACT

A method identifies, as an independent node, any node representing a circuit pattern in any odd loop of a layout of a region of a layer of an IC that is not included in any other odd loop of the layout. The layer is to have a plurality of circuit patterns to be patterned using at least three photomasks. The method identifies, as a safe independent node, any independent node not closer than a threshold distance from any other independent nodes in another odd loop of the layout. The layout is modified, if the circuit patterns in the layout include any odd loop without any safe independent node, so that that after the modifying, each odd loop has at least one safe independent node.

19 Claims, 10 Drawing Sheets

(56) References Cited

U.S. PATENT DOCUMENTS

| | | |
|---|---|---|
| 8,151,225 B2 | 4/2012 | Maeda |
| 8,365,102 B2 | 1/2013 | Wang et al. |
| 8,448,100 B1 | 5/2013 | Lin et al. |
| 8,468,470 B2 | 6/2013 | Hsu et al. |
| 8,473,873 B2 | 6/2013 | Hsu et al. |
| 8,473,874 B1 | 6/2013 | Sharma et al. |
| 8,601,409 B1 * | 12/2013 | Chen et al. ............... 716/55 |
| 8,677,297 B2 * | 3/2014 | Chase et al. ............. 716/112 |
| 8,875,065 B1 * | 10/2014 | Lin et al. ................. 716/52 |
| 2008/0037861 A1 | 2/2008 | Nikolsky |
| 2010/0153905 A1 | 6/2010 | Maeda |
| 2011/0078638 A1 * | 3/2011 | Kahng et al. ............ 716/52 |
| 2013/0074024 A1 | 3/2013 | Chase et al. |
| 2013/0091476 A1 | 4/2013 | Chen et al. |
| 2014/0149955 A1 * | 5/2014 | Chase et al. ............. 716/112 |
| 2014/0372958 A1 * | 12/2014 | Lin et al. ................. 716/52 |
| 2015/0052490 A1 * | 2/2015 | Cilingir et al. ........... 716/52 |

OTHER PUBLICATIONS

Cork, C. et al., "Comparison of Triple Patterning Decomposition Algorithms Using Aperiodic Tiling Patterns", Photomask and Next-Generation Lithography Mask Technology XV, edited by T. Horiuchi, Proceedings of the SPIE, 2008, 7028:702839-702839-7.

Yu, B. et al., "Layout Decomposition for Triple Patterning Lithography", 2011 IEEE/ACM International Conference on Computer-Aided Design (ICCAD), Nov. 2011, pp. 1-8.

* cited by examiner

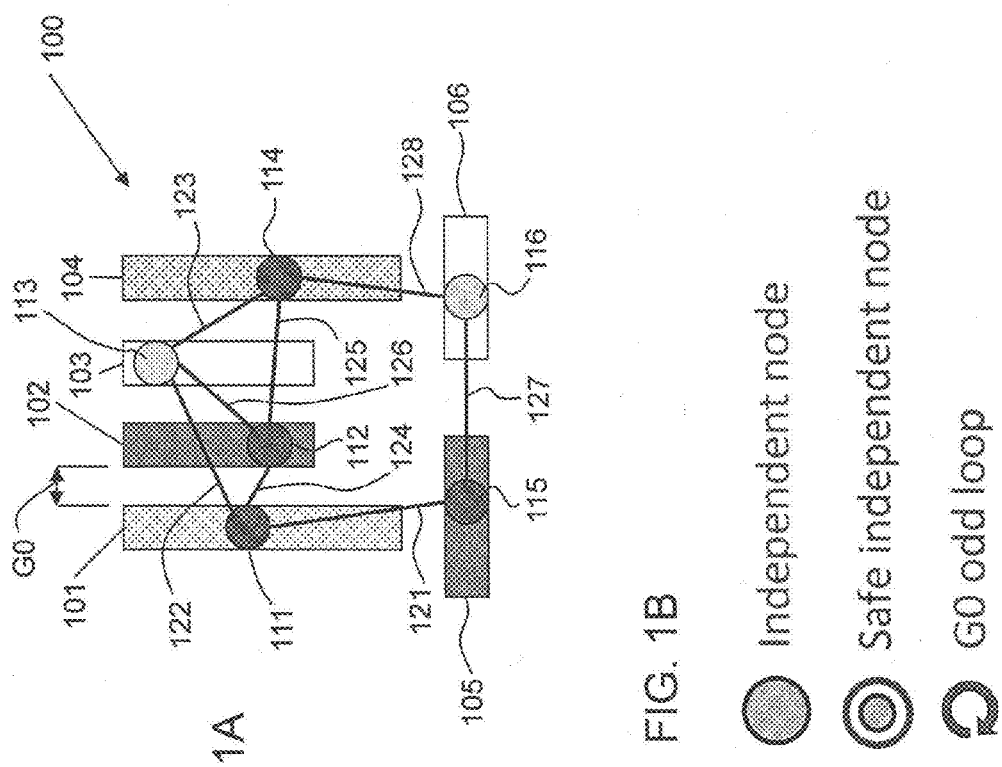
FIG. 1A
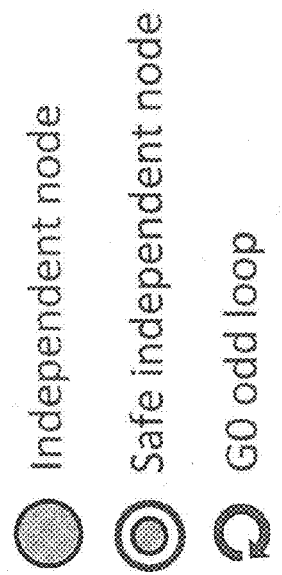
FIG. 1B
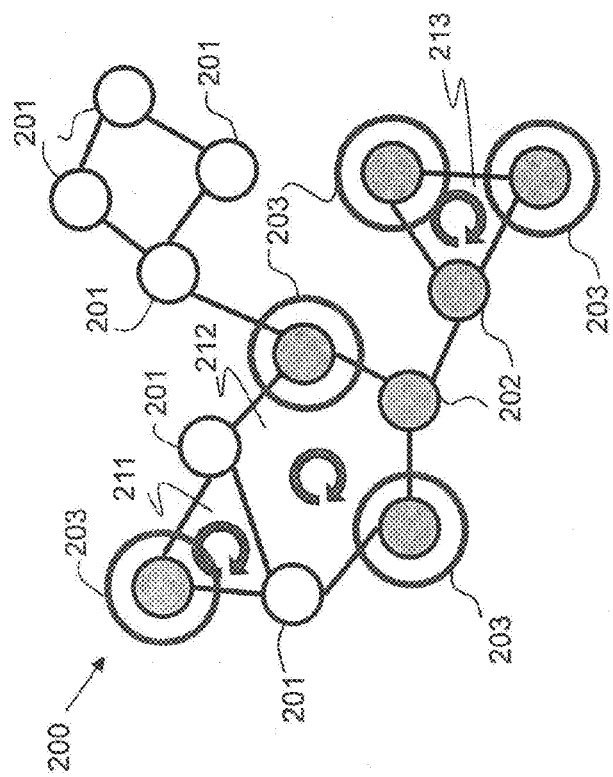

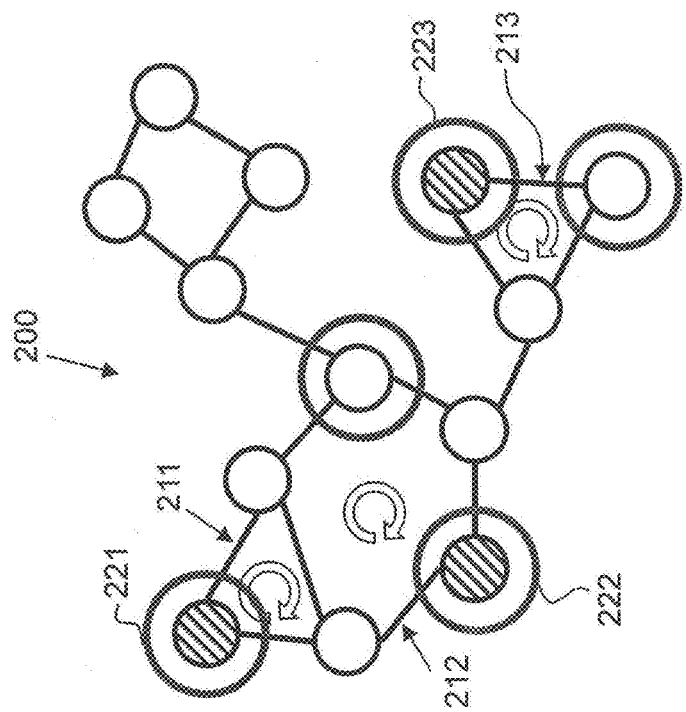
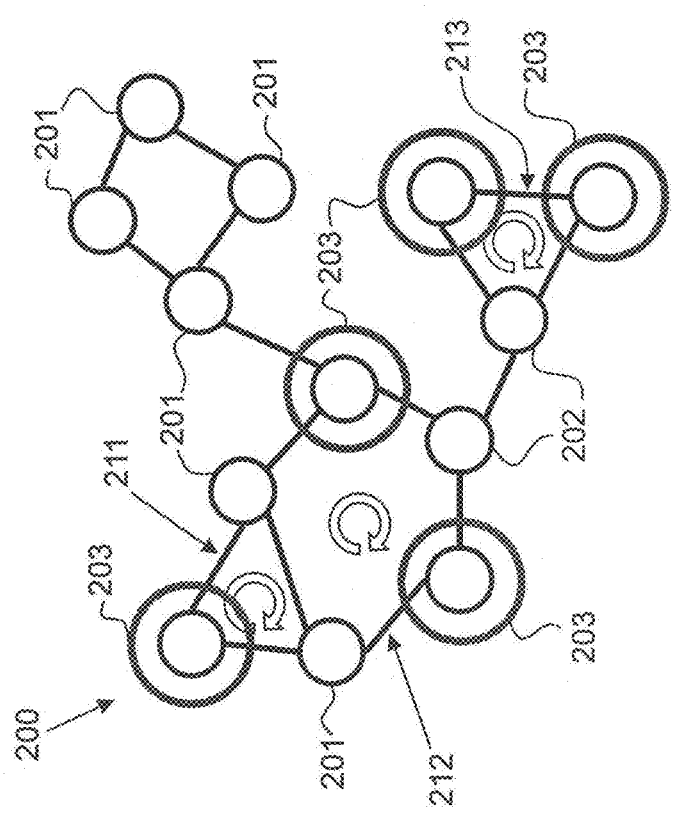
FIG. 2A
FIG. 2B

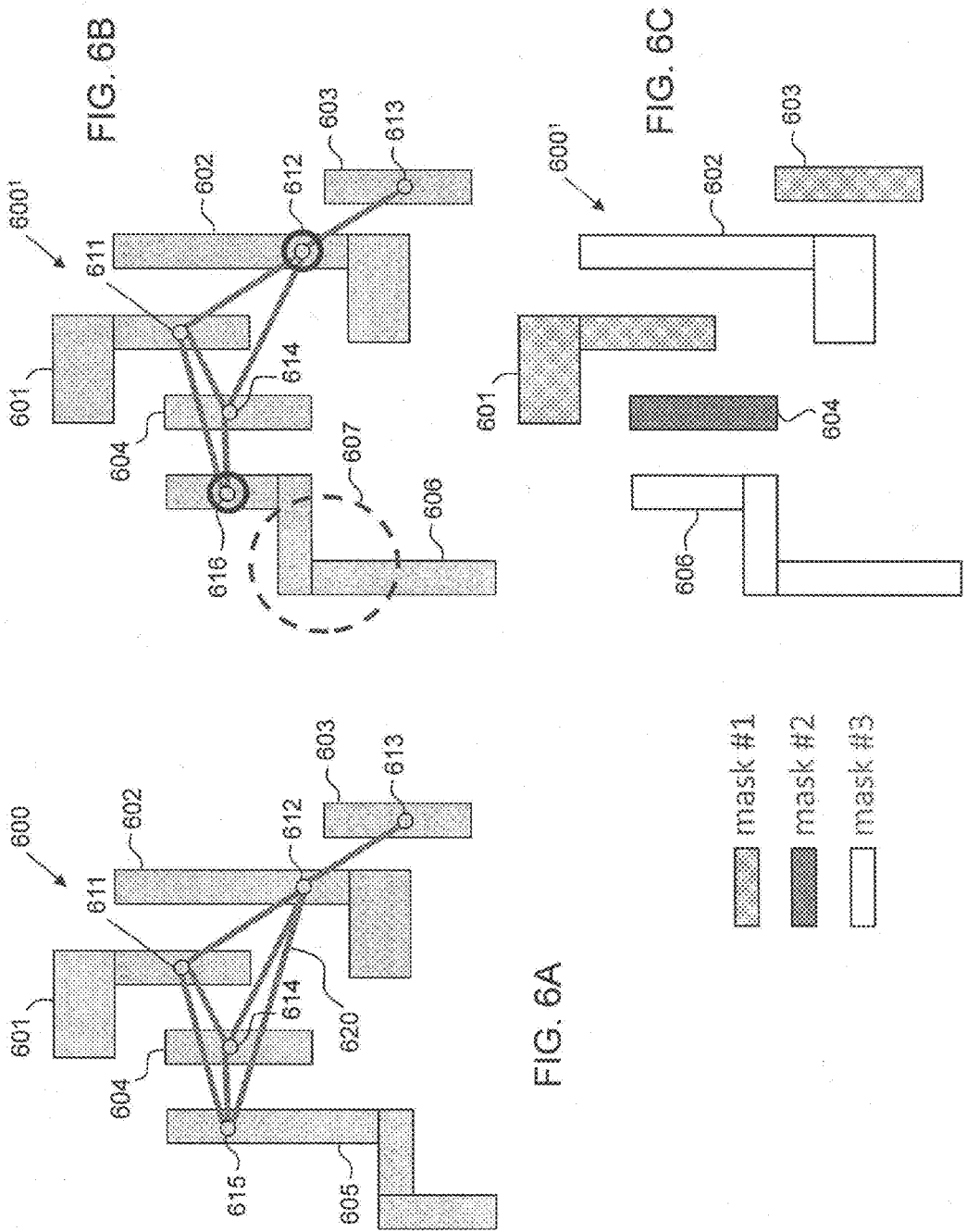

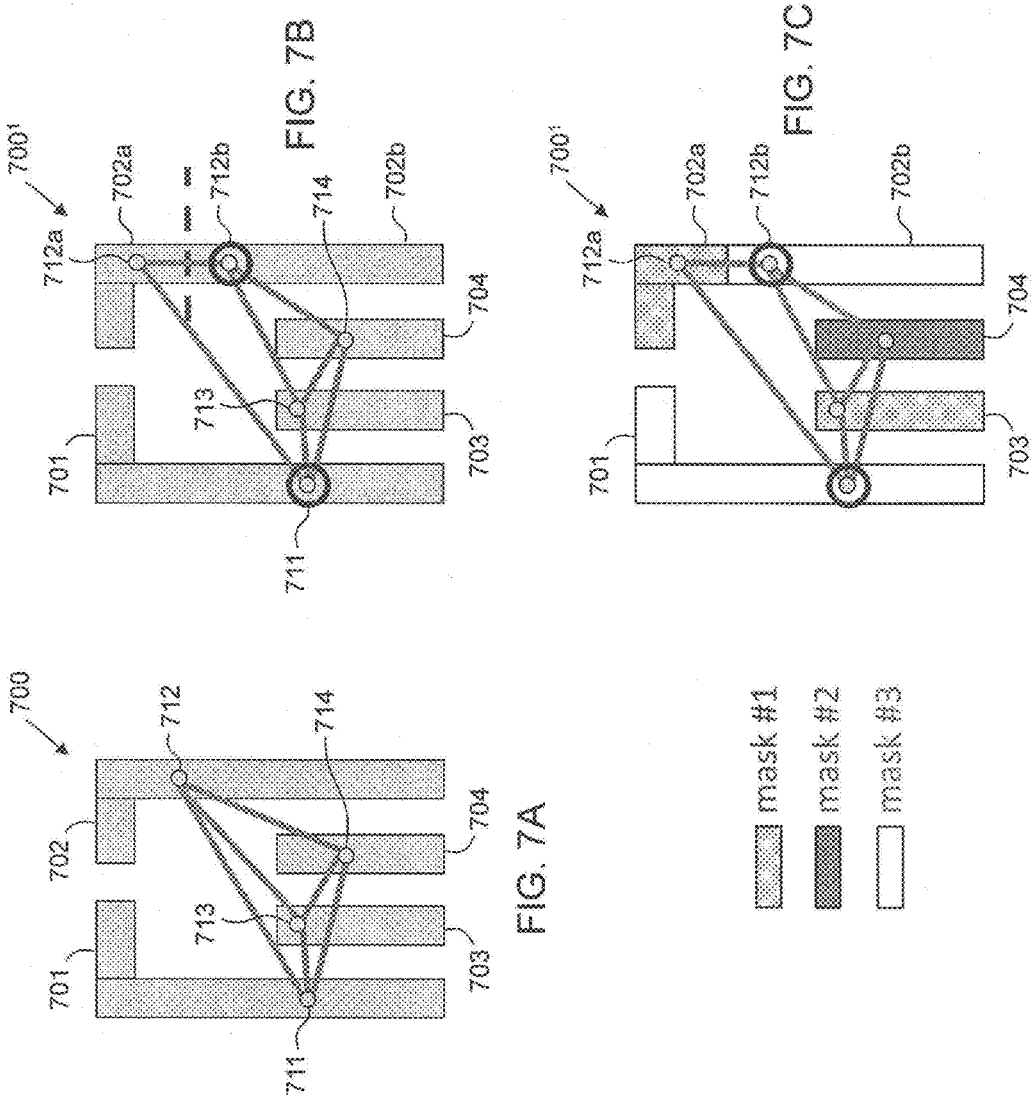

US 9,262,577 B2

LAYOUT METHOD AND SYSTEM FOR MULTI-PATTERNING INTEGRATED CIRCUITS

This application is a continuation of U.S. patent application Ser. No. 13/535,705, filed Jun. 28, 2012, which is expressly incorporated by reference herein in its entirety.

FIELD

This disclosure relates generally to integrated circuits (ICs), and more specifically to methods and automated tools for designing layouts for multi-patterning.

BACKGROUND

In semiconductor fabrication processes, the resolution of a photoresist pattern begins to blur at about 45 nanometer (nm) half pitch. To continue to use fabrication equipment purchased for larger technology nodes, multi-exposure methods have been developed.

Multiple exposure or multi-patterning technology (MPT) involves forming patterns on a single layer of a substrate using two or more different masks in succession. As long as the patterns within each individual mask comply with the relevant minimum separation distances for the technology node, the combination of patterns formed using the plural masks may include smaller separations than the minimum separation distance. MPT allows line segments, and in some cases, vertices (angles) to be formed of a vertical segment and a horizontal segment on the same mask. Thus, MPT provides flexibility and generally allows for significant reduction in overall IC layout.

MPT is a layout splitting method analogous to an M-coloring problem for layout splitting in graph theory, where M is the number of masks used to expose a single layer (and the number of exposures). For example, if two masks are to be used (double patterning, DPT), it is customary to refer to the patterns as being assigned one of two "color types", where the color corresponds to a photomask assignment.

If a given pattern in a given layer cannot be assigned to a different mask from every adjacent pattern in the same layer that is closer than the minimum separation distance, the layout has an MPT conflict. The designer can resolve the MPT conflict without increasing the number of masks by making a change to the layout or inserting a stitch.

BRIEF DESCRIPTION OF THE DRAWINGS

FIG. 1A is a diagram of a layout of a layer of an IC, with a graph representing the layout overlaid on the circuit patterns of the layout.

FIG. 1B is a graph of a layout of a layer of an IC to be patterned using MPT.

FIG. 2A shows a graph of the layout of FIG. 1B, identifying independent nodes and safe independent nodes.

FIG. 2B shows the selection of a single safe independent node in each odd loop of the layout of FIG. 2A, to be formed by a first photomask.

FIG. 6A is an example of a layout to be patterned by triple patterning technology (TPT), with a graph representing the circuit patterns overlaid on the layout.

FIG. 6B shows the layout and graph of FIG. 6A, after a modification to one of the circuit patterns.

FIG. 6C shows the TPT mask assignments of the layout of FIG. 6B.

FIG. 7A is an example of a layout to be patterned by triple patterning technology (TPT), with a graph representing the circuit patterns overlaid on the layout.

FIG. 7B shows the layout and graph of FIG. 7A, after inserting a stitch in one of the circuit patterns.

FIG. 7C shows the TPT mask assignments of the layout of FIG. 7B.

DETAILED DESCRIPTION

Figure 2D:
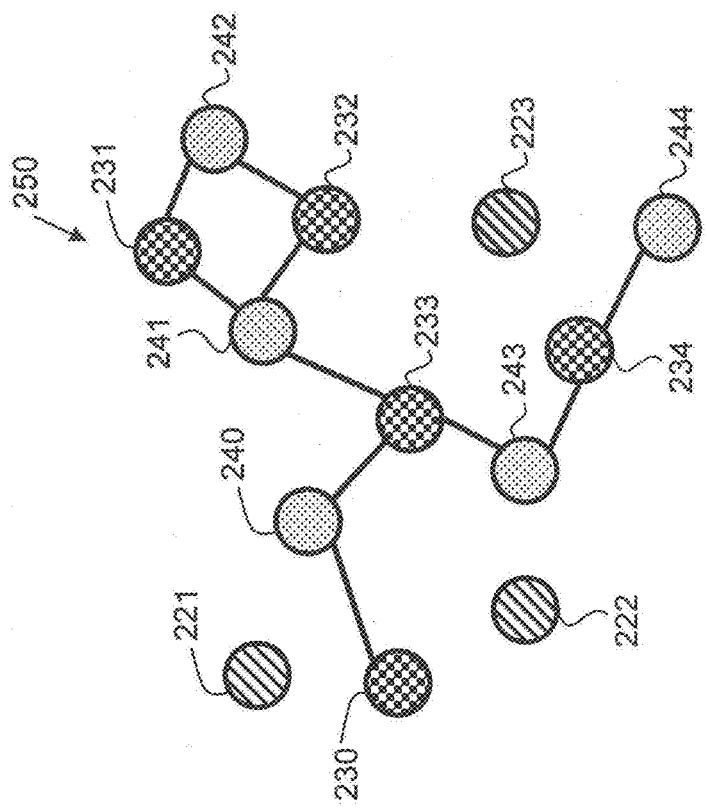
FIG. 2D shows the photomask assignments of the remaining nodes shown in FIG. 2C.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation.

This disclosure provides layout methods for guiding layout designers or EDA layout tools to generate MPT (Multi-Patterning Technology)-compliant layout with zero or small area penalty. These methods can avoid many unnecessary restrictions on the layout choices available to IC designers. Although specific examples are included applying the method to triple-patterning technology (TPT) for ease of explaining the concepts, the method can be applied to MPT techniques having larger number of photomasks.

An MPT mask assignment method generally includes: (1) identifying whether a layout has a native MPT conflict that prevents decomposition of the layout into the pre-determined number of photomasks to be used; (2) modifying the layout, if necessary, to eliminate the MPT conflicts; and (3) assigning the circuit patterns in the layout to the predetermined number of photomasks. As described below, step (1) can be achieved systematically for MPT using three or more photomasks to pattern a single layer.

FIGS. 1A and 1B introduce some basic terms and conventions used herein. FIG. 1A shows a layout 100 of a plurality of circuit patterns 101-106. In some embodiments, the layout includes all of the circuit patterns on a layer of an IC. In other embodiments, the layout includes a subset of the circuit patterns within a region of the layer of the IC. The circuit patterns can be interconnect (line layer) patterns in a back end of line (BEOL) interconnect layer, or active device (front end of line) layer patterns.

A graph representing the circuit patterns is shown overlaid on the layout. The graph includes a plurality of nodes 111-116 representing the respective circuit patterns 101-106. Although reference is made to nodes below, it is understood that the nodes are lumped representations of the circuit patterns; the nodes are convenient for diagramming and for the purpose of analyzing and assigning the patterns to various photomasks using automated tools.

For a given IC technology (e.g., 65 nm, 45 nm, 28 nm, or the like), a respective minimum separation distance (abbreviated G0) is defined, such that two patterns closer to each other than the G0 distance cannot be patterned clearly using a single photomask and exposure. Within the graph, any two nodes 111-116 which are separated by a distance less than this threshold (a "sub-G0 distance") is indicated by an edge 121-128. A pair of nodes which are separated by more than this threshold distance (e.g., nodes 111 and 114) do not have any connecting edge joining them in the graph. If three or more edges form a polygon, the polygon (and the circuit patterns connected by it) is called a loop. If the polygon has an odd number of edges, it is referred to as an odd loop.

As indicated by the edges 121-128, each of the patterns is too close to one or more other patterns to be formed using a single photomask. In the layout 100 of FIG. 1A, the patterns 101-106 are assigned to three photomasks. Patterns 101 and 104 are assigned to a first photomask, patterns 102 and 105 are assigned to a second photomask, and patterns 103 and 106 are assigned to a third photomask. With this set of assignments, the patterns formed during each of the three exposure steps can be patterned clearly. If a circuit patterns in a layout can be assigned to three different photomasks in such a way that within each of the masks, no pair of adjacent patterns are closer to each other than the minimum threshold (G0) distance, the layout is triple patterning technology (TPT) compliant. More generally, if a circuit patterns in a layout can be assigned to N different photomasks (N>2) in such a way that within each of the masks, no pair of adjacent patterns are closer to each other than the minimum threshold (G0) distance, the layout is multi-patterning (MPT) compliant.

FIG. 1B introduces the nomenclature of independent nodes and safe independent nodes. An independent node is a node of an odd loop that is not included in other smallest (or simplest) odd loops. Note that an odd loop can be contained by other larger odd loops. For example as shown in FIG. 7B, the independent nodes 711 and 712b are also included in the larger 5-length odd loop of 712a-711-713-714-712b (a composite odd loop containing 1 odd loop and 1 even loop), but in the process of identifying an independent node, this larger odd loop is not counted so that 711 and 712b are considered independent nodes. The independent nodes include the "simplest" odd loop (e.g., 711-713-714) and exclude "composite" larger odd loops formed by a simplest odd loop and an abutting even loop (e.g., 712a-711-713-714-712b).

An electronic design automation (EDA) tool (discussed with reference to FIG. 5) is programmed to identify, as an independent node 202, 203, any node representing a respective circuit pattern in any odd loop of a layout of at least a region of a layer of an integrated circuit (IC) that is not included in any other odd loop of the layout. In FIG. 1B, there are three odd loops 211-213, indicated by curved arrows. These odd loops 211-213 each have three or five nodes 202, 203, and a corresponding number of edges. Odd loop 211 shares an edge and two nodes 201 with odd loop 212. Thus odd loop 211 has a single independent node 203, and odd loop 212 has three independent nodes 202, 203. Odd loop 213 does not share any nodes or edges with any other loop, and thus has three independent nodes 202, 203.

Referring again to FIG. 1B, a safe independent node is an independent node not directly connected to another independent node of any other odd loop. The EDA tool is also programmed to identify, as a safe independent node 203, any of the independent nodes not closer than a threshold distance from any other one of said independent nodes in another odd loop of the layout. Using the graph nomenclature, a safe independent node is an independent node not directly connected to another independent node of other odd loops by an edge of the graph (i.e., not directly connected to another independent node of another odd loop by a sub-G0 spacing).

The safe independent nodes 203 in FIG. 1B are indicated by a circle around an independent node. Thus, loop 211 has one safe independent node, loop 212 has two safe independent nodes, and loop 213 has three safe independent nodes.

The inventors have determined that a layout is TPT compliant if every sub-G0 odd loop has at least one safe independent node. If an initial layout (as first generated by the place and route tool 504, FIG. 5) has a sub-G0 odd loop without any safe independent node, the layout is modified, so that that after the modifying, every sub-G0 odd loop has at least one safe independent node. This renders the layout TPT compliant. Further, layouts to be patterned with more than three photomasks are or can be made MPT compliant if every sub-G0 odd loop has at least one safe independent node.

Figure 2C:
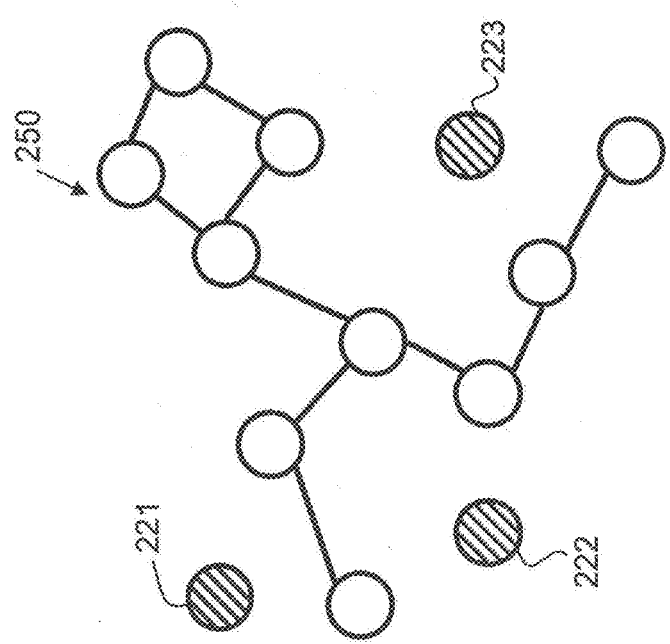
FIG. 2C shows the remaining nodes representing circuit patterns in the layout of FIG. 2B, to be assigned to second and third photomasks.
Figure 2F:
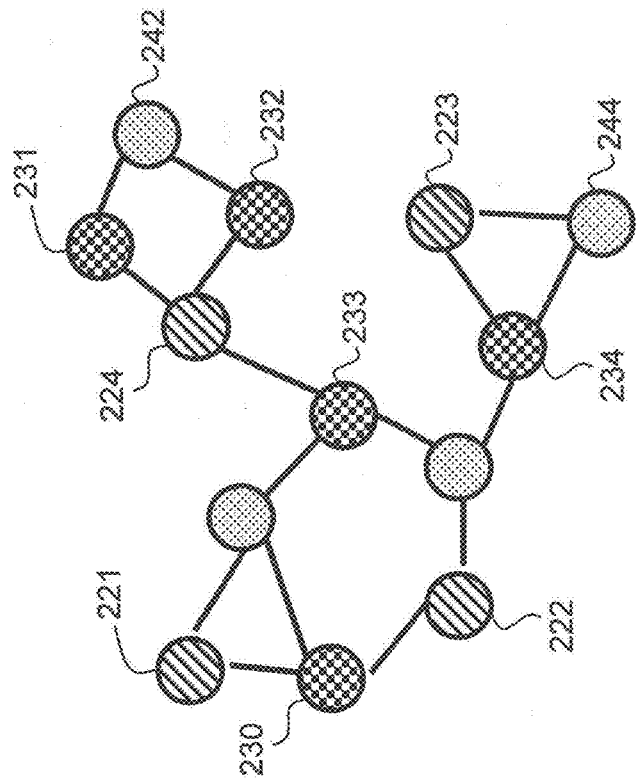
FIG. 2F shows the graph of the layout of FIG. 2E, with one of the circuit patterns re-assigned to balance the total circuit pattern areas assigned to each mask.
Figure 2E:
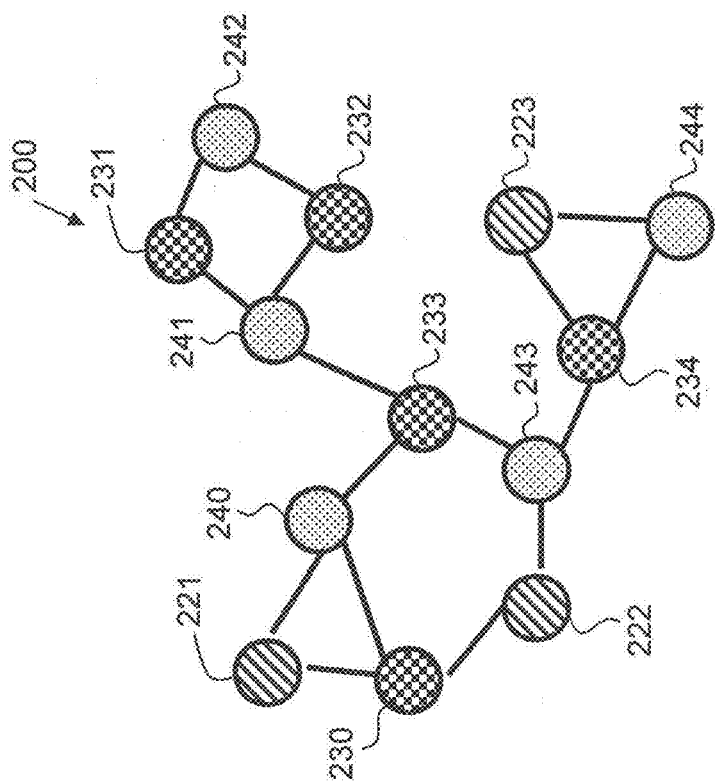
FIG. 2E shows the complete graph of the layout of FIG. 2D, including circuit patterns assigned to all three photomasks.
Figure 3A:
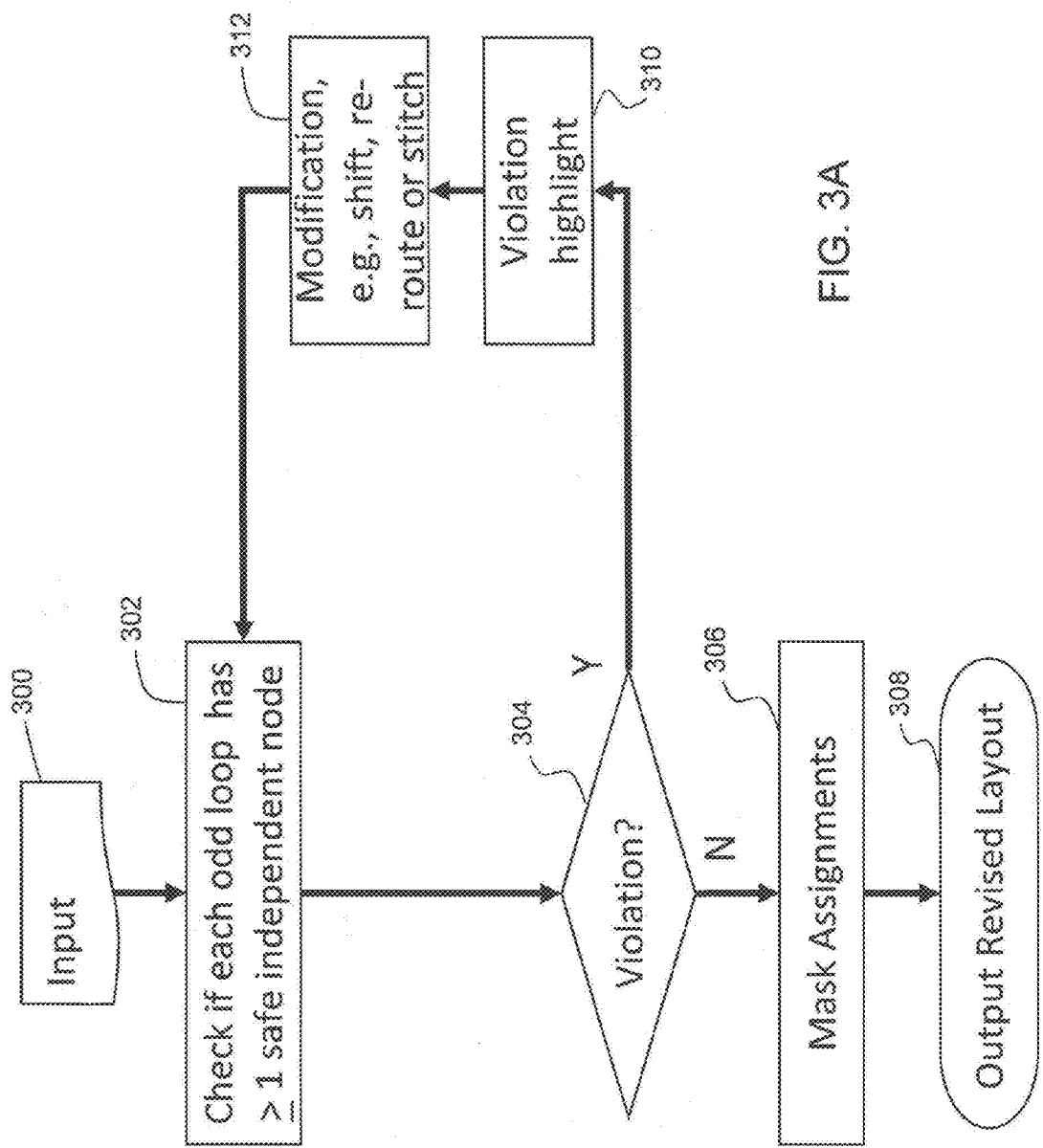
FIG. 3A is a flow chart of a method for making MPT mask assignments of circuit patterns of a layer of an IC to three or more photomasks.

FIG. 3A is a flow chart of a method of rendering a layout MPT compliant (in this example, TPT compliant), and assigning the circuit patterns of the layout to respective masks. FIGS. 2A-2E are graphs of the layout of FIG. 1B, showing a detailed example of a photomask assignment process, graphically.

At step 300 of FIG. 3A, a layout, such as the layout of FIG. 2A is input. For example, the initial layout is generated by a place and route tool. The layout can be in computer aided design format (e.g. GDSII), chip design, or retrieved from a design database.

At step 302, all sub-G0 (closer than the threshold distance) spacings are identified. Each odd loop of the layout is identified (e.g., by identifying each set of an odd number of circuit patterns, where each of the patterns is closer than the threshold (G0) distance to each of two other patterns in the set), and a check is made whether each odd loop has at least one safe independent node.

At step 304, a determination is made whether there is a violation of the safe independent node criterion. If there is a violation, steps 310 and 312 are performed. If there is not violation, step 306 is performed next.

At step 310, in some embodiments, a graph highlighting the odd loop without a safe independent node is displayed on a display device, to instruct the user to make a modification to provide that odd loop with a safe independent node. In some embodiments, the graph indicates which nodes throughout the layout are independent nodes.

At step 312, the user makes a modification to the layout. The modification can be shifting or re-routing a portion of the one of the patterns (as shown in FIG. 6B), or inserting a stitch into one of the patterns (as shown in FIG. 7B).

At step 306, having modified the layout, if appropriate, so that every odd loop has at least one safe independent node, the circuit patterns are assigned to respective masks. FIGS. 2A-2F show the method of mask assignment.

At step 308, the photomask assignments of the revised mask layout having the mask assignments is stored in a non-transitory machine readable storage medium for use in a design verification or photomask fabrication process for use in a multi-patterning IC fabrication process using the at least three photomasks. The output can include the revised circuit layout, IC design, design database, or/and masks.

Figure 3B:
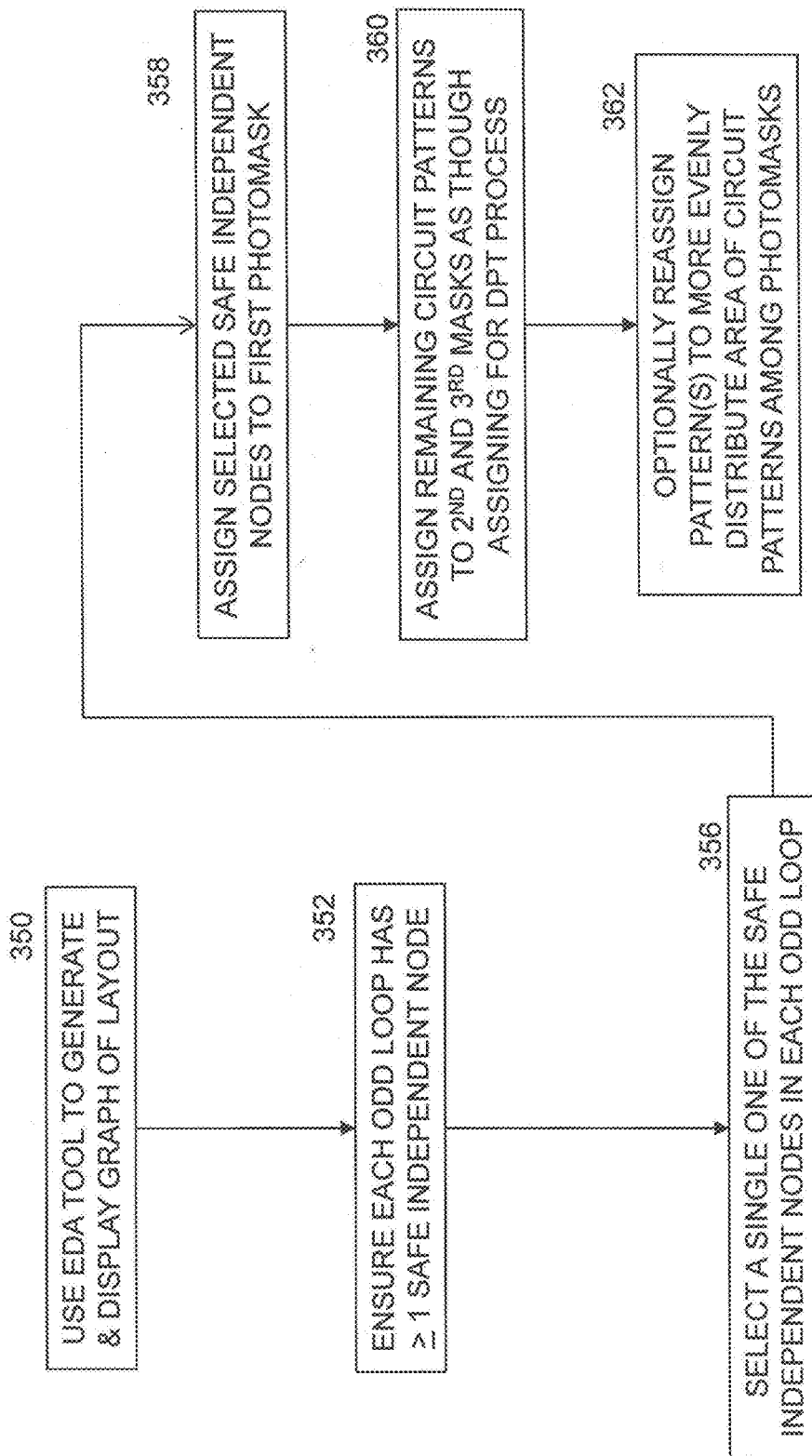
FIG. 3B is a flow chart showing details of mask assignment.

FIG. 3B is a flow chart of a mask assignment method. The graph of FIG. 1B is shown at various stages of the mask assignment method in FIGS. 2A-2F.

At step 350 of FIG. 3B, the EDA tool to generate a graph of the layout of the layer of the IC, the graph including nodes representing circuit patterns, the nodes connected by edges representing respective separations between adjacent ones of the circuit patterns smaller than a threshold distance.

At step 352 of FIG. 3B, the graph in FIG. 2A is examined to ensure that every odd loop 211-213 has at least one safe independent node 203. In the example of FIG. 2A, odd loops 212 and 213 each have two safe independent nodes. Loop 211 has one safe independent node, loop 212 has two safe independent nodes, and loop 213 has three safe independent nodes.

At step 356 of FIG. 3B, as shown in FIG. 2B, a respective circuit pattern represented by a single one of the safe independent nodes 221-223 in each identified odd loop is selected.

At step 358 of FIG. 3B, as shown in FIG. 2C, the selected ones 221-223 of the safe independent nodes 203 are assigned to a first one of the photomasks. Now that patterns 221-223 have been assigned to a separate mask from the remaining nodes 250, the edges connecting patterns 221-223 to the rest of the patterns can be ignored for the remainder of the assignment process. The remaining nodes of the graph are now considered and assigned to the remaining two photomasks as though these were the only circuit patterns to be assigned in a double patterning process. An inspection of the remaining patterns in FIG. 2C shows that there are no remaining odd loops in the remaining nodes of the layout. There is a single even loop, which is two-colorable. Thus, a simple assignment method, including assigning successive nodes to alternating photomasks will not generate any MPT conflicts. At the completion of this step, each circuit patterns assigned to the first photomask has no design rule violation (e.g., is at least a threshold distance away from each other photomask assigned to the first photomask, or satisfies a pattern density rule).

At step 360 of FIG. 3B, as shown in FIG. 2D, the remaining patterns 230-234 are assigned to the second mask; and the patterns 240-244 are assigned to the third mask. In an example wherein the multi-patterning process is a triple patterning process, this step further comprises assigning each remaining circuit pattern in the layout to the second and third of the three photomasks using a double patterning mask assignment technique.

In another embodiment in which four or more photomasks are to be used, then the step of assigning the remaining patterns to the rest of the photomasks includes assigning patterns to the remaining three or more masks round-robin. That is, sequential circuit patterns are assigned to respective photomasks in a predetermined sequence.

In some embodiments (M>3; M=number of masks), to generate MPT coloring (mask assignment) results, the method first uses N (where N<M−1) colors to color at least one safe independent node for every odd loop without inducing coloring conflicts, and use remaining (M−N) colors to color the remaining odd-loop free uncolored graph. In other words, if there will be four or more masks, after initially identifying all of the safe independent nodes in each odd loop, the safe independent nodes can be divided among N masks. For example, if an odd loop has two safe independent nodes, one of the safe independent nodes in that odd loop can be assigned to a first mask, and the other safe independent node can be assigned to a second mask. Then the remaining nodes are assigned to the remaining masks. Alternatively, even if there is only one safe independent node in each odd loop, these safe independent nodes can be divided among two or more masks, separate from the remaining nodes.

FIG. 2E shows all of the nodes in the graph, with their respective assignments to the three photomasks. All of the edges representing sub-G0 spacings are again shown in the graph of FIG. 2E. As apparent from inspection, none of the pairs of adjacent nodes connected by an edge in FIG. 2E are assigned to the same photomask.

At step 362 of FIG. 3B, as shown in FIG. 2F an optional step includes re-assigning one of the remaining circuit patterns 224 from one of the second and third photomasks to the first photomask, so long as each circuit pattern assigned to the first photomask has no design rule violation (e.g., is at least a threshold distance away from each other circuit pattern assigned to the first photomask, or satisfies a circuit density rule). The re-assigning of one of the remaining circuit patterns from one of the three photomasks to another of the three photomasks, can more evenly distribute a total area of circuit patterns in the layout of the layer of the IC among the three photomasks. This can improve process speed and/or uniformity.

Figure 4:
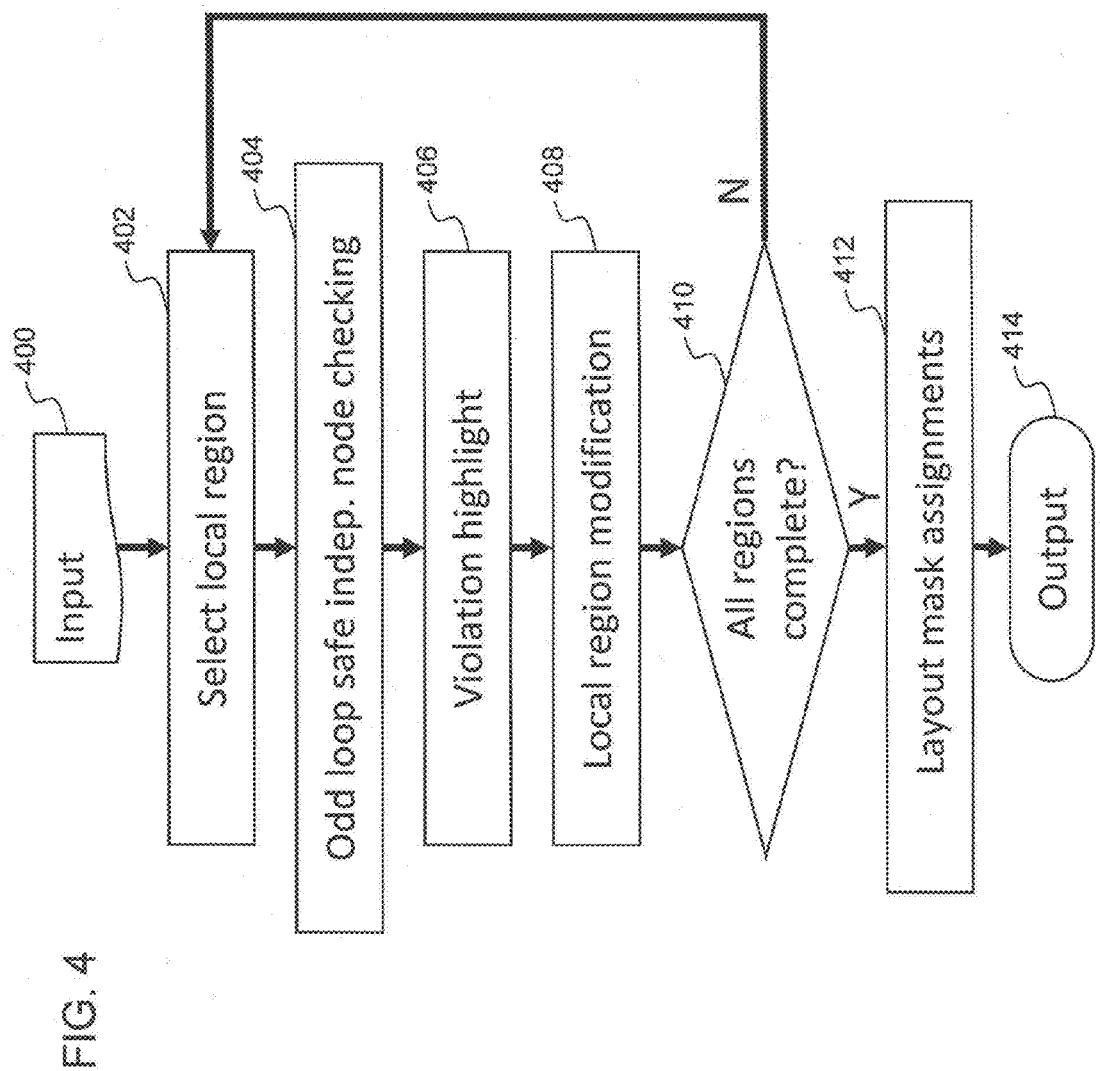
FIG. 4 is a flow chart of a method for making MPT mask assignments of circuit patterns of a region within a layer of an IC to three or more photomasks.

FIG. 4 is a flow chart of a variation of the method. Instead of assigning every pattern in the layer of the entire IC to the three or more masks, this method is applied to one selected region at a time.

At step 400, the tool inputs the initial layout of the layer of the IC.

At step 402, a local region is selected. The region should be selected so that none of the nodes in the region is connected by an edge to a node outside of the region. In other words, none of the circuit patterns within the region is closer than the G0 threshold distance to any of the circuit patterns outside of the region. In some embodiments, the tool causes the display to display the entire layout of the layer of the IC, and the user can select a region of the layer using a pointing device.

At step 404, a determination is made whether every odd loop in the region has at least one safe independent node.

At step 406, any violation (odd loop without at least one safe independent node) is indicated (e.g., by highlighting the nodes and edges of that odd loop, by showing the nodes and/or edges in a different color, by showing the edges in phantom, or the like).

At step 408, the user makes a modification to the local region, for example by shifting a pattern, re-routing a pattern, or inserting a stitch in a pattern. As each modification is made in the layout editing tool, the tool displays the modified layout. The tool also highlights any newly created safe independent nodes "on the fly" as the layout is modified.

In some cases, the modification is performed by plural iterations to ensure that every odd loop has at least one safe independent node. For example in the routing stage or in the layout editing stage or in the DRC highlight stage the layout modification can appear in many stages of the design flow.

At step 410, a determination is made whether all of the regions are complete. If not, steps 402-408 are repeated.

At step 412, the layout mask assignments for the region are made (following the method of FIGS. 3B and 2A-2F).

At step 414, the mask assignments of the layout of the region are output to a non-transitory machine readable storage medium to be accessed for performing a verification or photomask fabrication process.

Figure 5:
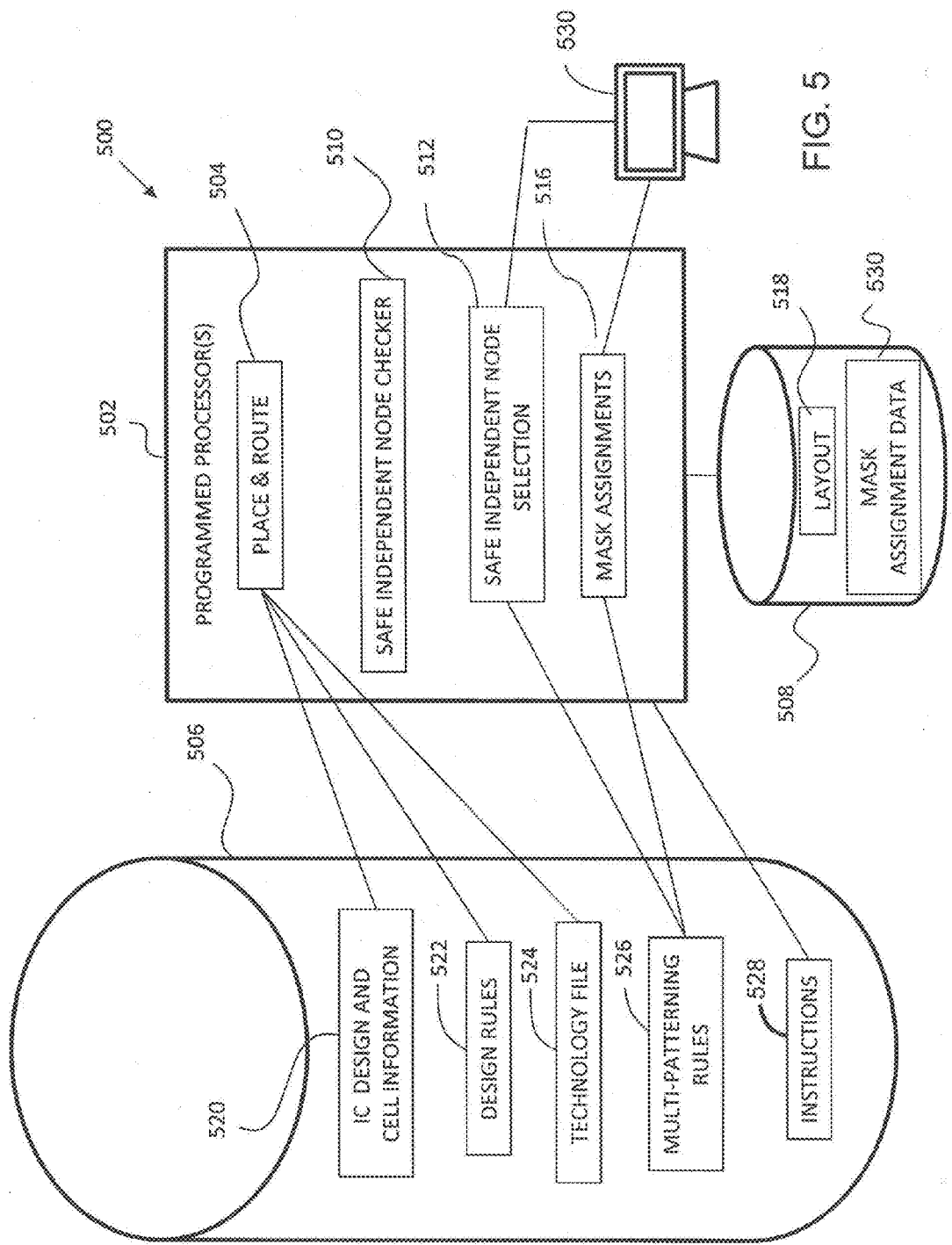
FIG. 5 is a block diagram of an electronic design automation (EDA) tool for designing the IC layout and making the MPT mask assignments.

FIG. 5 is a block diagram of an exemplary system according to one embodiment. System 500 includes at least one non-transitory, computer readable storage medium 508 for storing data representing a layout 518 of a layer of an integrated circuit (IC) comprising a plurality of polygons defining circuit patterns to be divided among a number (N) of photomasks for multi-patterning a single layer of a semiconductor substrate, where N is greater than two. Either the same storage medium 508 or a different storage medium 506 stores data and instructions used by the EDA tool 502. These include, but are not limited to IC design and cell information 520, design rules 522, technology file 524, additional multi-patterning design rules 526, and software program instructions 528.

System 500 includes an electronic design automation ("EDA") tool 502 such as "IC COMPILER"™, sold by Synopsys, Inc. of Mountain View, Calif., which may include a place and route tool 304, such as "ZROUTE"™, also sold by Synopsys. Other EDA tools 502 may be used, such as the "VIRTUOSO" custom design platform or the Cadence "ENCOUNTER"® digital IC design platform may be used, along with the "VIRTUOSO" chip assembly router 504, all sold by Cadence Design Systems, Inc. of San Jose, Calif. Alternatively, Calibre, by Mentor Graphics of Wilsonville, Oreg. can be used. Alternatively, the Laker custom design platform by SpringSoft USA of San Jose, Calif. can be used.

The technology file 524 and design rules 526 are configured to implement the safe independent node criteria described herein. For example, using the Mentor Graphics Calibre command structure, odd loops can be identified, and highlighted.

EDA tool 502 is a special purpose computer formed by retrieving stored program instructions from a non-transient computer readable storage medium 506, 508 and executing the instructions on a general purpose processor. Examples of non-transient computer readable storage mediums 506, 508 include, but are not limited to, hard disk drives (HDD), read only memories ("ROMs"), random access memories ("RAMs"), flash memories, or the like. Tangible, non-transient machine readable storage mediums 506, 508 are configured to store data generated by the place and route tool 504.

The router of the place and route tool 504 is capable of receiving an identification of a plurality of cells to be included in an integrated circuit ("IC") or interposer layout, including a netlist containing pairs of cells within the plurality of cells to be connected to each other. Router 504 may be equipped with a set of default design rules 522 and tech file 524. Router 504 generates the custom interconnect routing lines and vias for interconnecting the various devices of the IC.

The safe independent node checker 510 identifies the all of the sub-threshold (sub-G0) spacings between adjacent patterns in the layout of the layer of the IC (or the layout of a region of a layer of an IC. The safe independent node checker 510 causes a display device 530 to display the graph of the layout of the layer of the IC with an indication identifying the odd loop without any safe independent node.

In some embodiments, the safe independent node checker 510 displays a graph showing the nodes (with or without the circuit patterns overlaid on the graph) and the edges connecting the patterns. The safe independent node checker 510 then identifies each odd loop in the layout of the layer. Next, the safe independent node checker 510 evaluates each node of each odd loop to determine whether it is included in any other odd loop. Each node that is only included in a single odd loop is identified as an independent node. The safe independent node checker 510 evaluates each respective independent node to determine whether it is connected by an edge to another independent node in a different odd loop from the odd loop containing the respective independent node. If there is no such direct connection, then the respective independent node is a safe independent node. The safe independent node checker 510 evaluates every odd loop, and determines whether each odd loop has at least one safe independent node. If the safe independent node checker 510 identifies an odd loop without a safe independent node, action is taken. In some embodiments, the safe independent node checker 510 prompts the user to shift or re-route a pattern or insert a stitch. In other embodiments, the safe independent node checker 510 initiates an automated shift or re-routing by the router of the EDA tool. Once every odd loop has a safe independent node, the layout has been rendered three-colorable (i.e., capable of being divided and assigned to three photomasks for patterning, such that within each individual photomask, no two patterns are closer to each other than the minimum separation distance (G0) for clear patterning at the particular technology node being used.

A safe independent node selection tool 512 evaluates whether each odd loop has more than one safe independent node. If an odd loop has more than one safe independent node, the safe independent node selection tool 512 selects a single one of the safe independent nodes in each odd loop to be included in the first photomask. The selection can be random, or a rule to implement and/or execute in an EDA tool can be selected. For example, the leftmost safe independent node in each odd loop can be selected. It is noted that in some layouts having odd loops with more than one safe independent node, assigning two safe independent nodes from the same odd loop to the same photomask can induce an MPT conflict. Alternatively, the safe independent node selection tool 512 can display each of the safe independent nodes in each odd loop, and prompt the user to select a single safe independent node in each odd loop.

The mask assignment tool 516 applies the MPT rules 526 and determines the assignment of each remaining polygon to one of the two remaining photomasks. Tool 512 assigns the circuit patterns within each group to a respective mask to provide mask assignment data, for forming each group of circuit patterns on or in the single layer of the IC. The assignments alternate between the two masks. In the case of TPT, once a safe independent node from each odd loop has been assigned to the first mask, there are no remaining native conflicts (groups of polygons that cannot be divided among the available number of photomasks in any combination to avoid having two polygons closer to each other than the G0 distance). The mask assignment tool evaluates the total area assigned to each mask. If the areas are not approximately the same, then the mask assignment tool evaluates whether any circuit patterns can be re-assigned from one of the masks to another of the masks, to balance the total area patterned by each mask. Balancing the pattern area among the masks helps to reduce process variations.

The mask assignment tool 516 outputs the mask assignment data 530 to the non-transitory machine readable storage medium 508 for use by a verification or photomask fabrication process.

If more than three photomasks are to be used for MPT, the mask assignment tool 516 assigns the remaining patterns round-robin. For example, if quadruple patterning is used, and the selected safe independent nodes from each odd loop are assigned to the first mask, then nine remaining patterns can be assigned with sequential patterns 1, 4, and 7 on the second mask, patterns 2, 5 and 8 on the third mask, and patterns 3, 6 and 9 on the fourth mask.

Block 502 indicates that one or more programmed processors may be included. In some embodiments, the processing load is performed by two or more application programs, each operating on a separate processor. In other embodiments, the processes are all performed using one processor. Similarly, two media 506 and 508 are shown, but the data may be stored in any number of media.

Although FIG. 5 shows an allocation of the various tasks to specific modules, this is only one example. The various tasks may be assigned to different modules to improve performance, or improve the ease of programming.

FIGS. 6A-6C show a layout modification to provide a safe independent node to an odd loop that does not initially have any safe independent node. FIG. 6A shows an initial layout 600 having patterns 601-605. The graph of the corresponding nodes 611-615 is overlaid on the circuit patterns. Each of the nodes 611, 612, 614 and 615 is included in an least two different odd loops. Thus, by definition, none of the nodes 611, 612, 614, and 615 is a safe independent node.

FIG. 6B shows the same layout, after shifting the jog 607 in pattern 605, to form a modified pattern 606. This shift increases the minimum separation between patterns 606 and 602 to above the threshold G0 distance, so that there is no longer any edge 620 (FIG. 6A) connecting nodes 612 and 616 (FIG. 6B). The remaining patterns and separations are unaffected by the shifting. As a result, nodes 616 and 612 are now both independent nodes, because nodes 616 and 612 are each only included in a single respective odd loop. Further, nodes 616 and 612 are safe independent nodes, because neither is directly connected to another independent node in any other odd loop. Thus, following the shift, the criterion that every odd loop has at least one safe independent node is met. The layout is capable of being triple patterned. FIG. 6C shows an example of mask assignments for triple patterning this layout. Patterns 602 and 606 are assigned to a first mask. Patterns 601 and 603 are assigned to a second mask. Pattern 604 is assigned to a third mask.

Although FIG. 6B shows a modification by shifting a jog, one of ordinary skill can readily re-route a pattern (e.g., pattern 605). For example, the jog pattern could be replaced by an angle, or other polygon having the same start and end points.

FIGS. 7A-7C show a layout modification by stitching to provide a safe independent node and change an odd loop that does not initially have any safe independent node to an even loop. FIG. 7A shows an initial layout 700 having patterns 701-704. The graph of the corresponding nodes 711-714 is overlaid on the circuit patterns. Each of the nodes 711, 712, 713 and 714 is included in an least two different odd loops. Thus, by definition, none of the nodes 711, 712, 713, nor 714 is a safe independent node.

FIG. 7B shows the same layout, after inserting a stitch in pattern 702, to form patterns 702a and 702b. This stitch changes the odd loop comprising nodes 711-713 into an even loop having nodes 711, 712a, 712b and 713. The remaining patterns and separations are unaffected by the shifting. As a result, nodes 711 and 712b are now both independent nodes, because nodes 711 and 712b are each only included in a single respective odd loop. (A first odd loop contains nodes 711, 713 and 714; a second odd loop has nodes 712b, 713 and 714.) Further, nodes 711 and 712b are safe independent nodes, because neither is directly connected to another independent node in any other odd loop. Thus, following the stitch, the criterion that every odd loop has at least one safe independent node is met. The layout is capable of being triple patterned. FIG. 7C shows an example of mask assignments for triple patterning this layout. Patterns 701 and 702b are assigned to a first mask. Patterns 702a and 703 are assigned to a second mask. Pattern 704 is assigned to a third mask.

The methods and system described herein may be at least partially embodied in the form of computer-implemented processes and apparatus for practicing those processes. The disclosed methods may also be at least partially embodied in the form of tangible, non-transient machine readable storage media encoded with computer program code. The media may include, for example, RAMs, ROMs, CD-ROMs, DVD-ROMs, BD-ROMs, hard disk drives, flash memories, or any other non-transient machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

An MPT-friendly layout design method is described that ensures every odd loop has at least one safe independent node. To generate MPT (M>2; M=number of masks) coloring (mask assignment) results, the method first uses N (where N<M−1) colors to color at least one safe independent node for every odd loop without inducing coloring conflicts, and use remaining (M−N) colors to color the remaining odd-loop free uncolored graph.

One embodiment is TPT, but any number N of masks greater than two can be used. This method can be applied in layout design rule checks (DRC) (on-the-fly) checking (to check if every odd loop has at least one safe independent node). The design flow can include iterative rip-up and re-routing, for example, to generate an MPT-friendly layout.

In some embodiments, a method comprises: (a) identifying, as an independent node, any node representing a respective circuit pattern in any odd loop of a layout of at least a region of a layer of an integrated circuit (IC) that is not included in any other odd loop of the layout, where the layer is to have a plurality of circuit patterns to be patterned using at least three photomasks; (b) identifying, as a safe independent node, any said independent node not closer than a threshold distance from any other one of said independent nodes in another odd loop of the layout; and (c) modifying the layout, if the circuit patterns in the layout include any odd loop without any safe independent node, so that that after the modifying, each odd loop has at least one safe independent node.

In some embodiments, a non-transitory computer readable storage medium encoded with computer program instructions, such that when the computer program instructions are executed by a computer, the computer performs the method comprising: (a) identifying, as an independent node, any node representing a respective circuit pattern in any odd loop of a layout of a layer of an integrated circuit (IC) that is not included in any other odd loop of the layout, where the layer is to have a plurality of circuit patterns to be patterned using at least three photomasks; (b) identifying, as a safe independent node, any said independent node not closer than a threshold distance from any other one of said independent nodes in another odd loop of the layout of the layer of the IC; and (c) modifying the layout of the layer of the IC, if the circuit patterns in the layout include any odd loop without any safe independent node, so that that after the modifying, each odd loop has at least one safe independent node.

In some embodiments, a system comprises a special purpose computer tool configured to identify, as an independent node, any node representing a respective circuit pattern in any odd loop of a layout of a layer of an integrated circuit (IC) that is not included in any other odd loop of the layout, where the layer is to have a plurality of circuit patterns to be patterned using at least three photomasks. The tool is configured to identify, as a safe independent node, any said independent node not closer than a threshold distance from any other one of said independent nodes in another odd loop of the layout of the layer of the IC. The tool is configured to identify if the circuit patterns in the layout include any odd loop without any safe independent node. The tool includes a layout editor for modifying the layout of the layer of the IC, so that that after the modifying, each odd loop has at least one safe independent node.

Although the subject matter has been described in terms of exemplary embodiments, it is not limited thereto. Rather, the appended claims should be construed broadly, to include other variants and embodiments, which may be made by those skilled in the art.

The invention claimed is:

1. A method comprising:
checking a graph of a layer of an integrated circuit having circuit patterns, the graph including two or more loops, to determine whether any node within the graph is included in a respective single odd loop of the graph, and identifying each node that is included in a single odd loop as an independent node;
identifying, as a safe independent node, any said independent node not closer than a threshold distance from any other one of said independent nodes in another odd loop of the graph;
identifying any odd loop of the layout of the layer of the IC having at least one safe independent node; and
assigning a respective circuit pattern represented by a single one of the at least one safe independent node in each identified odd loop to a first one of at least three masks, such that each circuit pattern assigned to the first one of the at least three masks has no design rule violation,
wherein at least one of the steps of checking, identifying as a safe independent node, identifying any odd loop or assigning is performed by a computer.

2. The method of claim 1, further comprising:
assigning and storing mask assignments of the circuit patterns in a non-transitory machine readable storage medium for use in a design verification or mask fabrication process.

3. The method of claim 1, wherein the masks are configured for use in a triple patterning process, and the assigning step further comprises:
assigning each remaining circuit pattern in the layout to the second and third of the at least three masks using a double patterning mask assignment technique.

4. The method of claim 3, wherein the assigning step further comprises:
re-assigning one of the remaining circuit patterns from one of the second and third masks to the first mask.

5. The method of claim 3, further comprising:
re-assigning one of the remaining circuit patterns from one of the at least three masks to another of the at least three masks, so as to more evenly distribute a total area of circuit patterns in the layout of the layer of the IC among the three masks.

6. The method of claim 1, further comprising shifting or re-routing at least one of the circuit patterns of the layout of the layer of the IC.

7. The method of claim 1, further comprising inserting a stitch in at least one of the circuit patterns of the layout of the layer of the IC.

8. The method of claim 7, wherein the stitch is inserted in a circuit pattern of the odd loop without any safe independent node, so as to change that odd loop into an even loop.

9. The method of claim 1, further comprising before the assigning step:
causing a display device to display the graph of the layout of the layer of the IC with an indication identifying the odd loop without any safe independent node.

10. The method of claim 1, further comprising identifying and reporting a triple patterning conflict, if the graph representing the circuit patterns in the layer includes any odd loop without any safe independent node.

11. A non-transitory computer readable storage medium encoded with computer program instructions, such that when the computer program instructions are executed by a computer, the computer performs the method comprising:
checking a graph of a layer of an integrated circuit having two or more loops to determine whether any of the nodes within the graph which is included in a respective single odd loop of the graph, and identifying each node that is included in a single odd loop as an independent node, where the layer is to be triple patterned using three masks;
identifying, as a safe independent node, any said independent node not closer than a threshold distance from any other one of said independent nodes in another odd loop of the graph representing the layer of the IC; and
assigning a respective circuit pattern represented by a single one of the at least one safe independent node in each odd loop having at least one safe independent node, so that said respective circuit patterns are to be patterned by a single one of the three masks, and each circuit pattern assigned to the single one of the at least three masks has no design rule violation,
wherein at least one of the steps of checking, identifying as a safe independent node or assigning is performed by a computer.

12. The non-transitory computer readable storage medium of claim 11, further comprising:
assigning and storing mask assignments of the circuit patterns in a non-transitory machine readable storage medium for use in a design verification or mask fabrication process.

13. The non-transitory computer readable storage medium of claim 12, wherein the method further comprises:
assigning each remaining circuit pattern in the layout to the second and third of the three masks using a double patterning mask assignment technique.

14. The non-transitory computer readable storage medium of claim 13, wherein the method further comprises:
re-assigning one of the remaining circuit patterns from one of the second and third masks to the first mask so as to reduce a difference between respective total areas to be patterned by each respective one of the three masks.

15. A method comprising:
checking a graph of a layer of an integrated circuit (IC) having circuit patterns to be patterned by triple patterning using three masks, the graph including two or more loops representing groups of circuit patterns in the IC separated by less than a threshold distance, to determine whether any node within the graph representing one of the circuit patterns is included in a respective single odd loop of the graph, and identifying each node that is included in a single odd loop as an independent node;

identifying, as a safe independent node, any said independent node not closer than the threshold distance from any other one of said independent nodes in another odd loop of the graph; and identifying and reporting a triple patterning conflict, if the graph representing the circuit patterns in the layer includes any odd loop without any safe independent node, identifying any odd loop of the layout of the layer of the IC having at least one safe independent node;

assigning a respective circuit pattern represented by a single one of the at least one safe independent node in each identified odd loop to a first one of at least three masks, such that each circuit pattern assigned to the first one of the at least three masks has no design rule violation, wherein at least one of the steps of checking, identifying as a safe independent node or identifying and reporting is performed by a computer.

16. The method of claim 15, wherein the assigning step comprises:
assigning each remaining circuit pattern in the layout to the second and third of the at least three masks using a double patterning mask assignment technique.

17. The method of claim 15, further comprising inserting a stitch in a circuit pattern of the odd loop without any safe independent node, so as to change that odd loop into an even loop.

18. The method of claim 15, further comprising re-assigning one of the remaining circuit patterns from one of the second and third masks to the first mask so as to reduce a difference between respective total areas to be patterned by each respective one of the three masks.

19. The method of claim 15, further comprising:
using a computer implemented layout editor for modifying the layout of the layer of the IC if the graph representing the circuit patterns in the layout includes any odd loop without any safe independent node.

\* \* \* \* \*